April 19, 1938.  A. GARDNER  2,114,342

ARTIFICIAL FLY

Filed Jan. 30, 1936

Inventor
Archibald Gardner
By Pennie Davis Marvin & Edmonds
Attorneys

Patented Apr. 19, 1938

2,114,342

UNITED STATES PATENT OFFICE 2,114,342

ARTIFICIAL FLY

Archibald Gardner, Giffnock, near Glasgow, Scotland

Application January 30, 1936, Serial No. 61,557
In Great Britain February 12, 1935

2 Claims. (Cl. 43—48)

This invention relates to artificial flies for use by anglers.

A fly according to the invention is provided with wings formed integral with one another.

The wings are formed in one piece with a stem or stems adapted to be attached to the shank of the hook, the wings being suitably angled in relation to said stem or stems.

The wing structure is secured to the shank of the hook by the usual dressing tied around the hook shank.

The wings and the stem or stems are constituted of translucent sheet material, namely of proofed silk.

Figure 1:
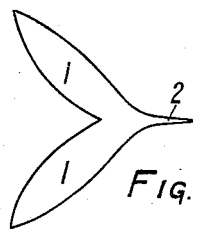
Figure 1A:
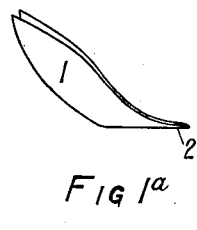
Figure 2:
Figure 2A:
Figure 5:
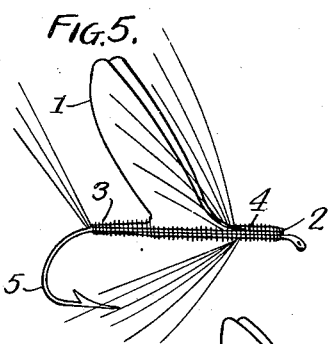
Figure 3:
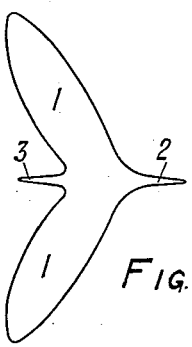
Figure 3A:
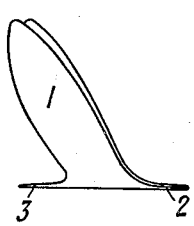
Figure 4:
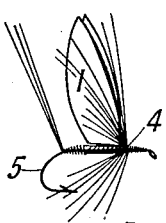

The invention is illustrated in the accompanying drawing in which Figs. 1–3 are plan views of wing-forming blanks cut from sheet material, and Figs. 1a–3a are elevations showing the blanks according to Figs. 1–3, respectively, folded to form pairs of wings. Fig. 4 shows a complete fly with wings as shown in Figs. 2 and 2a. Fig. 5 shows a complete fly with wings as shown in Figs. 3 and 3a.

As shown, the wings 1 of each pair are integral with one another, being cut to any desired wing-defining contour from translucent sheet material.

The wings shown in Figs. 1, 1a and in Figs. 2, 2a are formed integral with a forwardly directed stem 2 adapted for attachment to the forward end of the shank of a hook.

The wings shown in Figs. 3, 3a are formed integral with forward and rear stems 2, 3, respectively, adapted for attachment to the shank of the hook, as by means of a filamentary winding, as shown in Fig. 5.

The complete fly shown in Fig. 4 is provided with wings formed as shown in Figs. 2 and 2a, the stem 2 being tied at 4 to the shank of the hook 5.

I claim:—

1. An artificial fly for angling, comprising a hook having a shank forming a body for the fly, a wing structure, a stem protruding from said wing structure in a direction oblique to the outer edge of said wing structure, said stem being in one piece with said wing structure, and a filamentary dressing tied around said shank and around said stem and exclusively securing said wing structure to said shank, said wing structure being of translucent proofed silk fabric and angled in relation to said shank.

2. An artificial fly for angling, comprising a hook having a shank forming a body for the fly, a pair of diverging wings formed in one piece with a stem protruding between the wings at the head and with a stem protruding between the wings at the tail, and a filamentary dressing tied around said shank and around said stems and exclusively securing said wings to said shank, said wings being of translucent proofed silk fabric and angled in relation to said shank.

ARCHIBALD GARDNER.